United States Patent [19]

Meyerrose

[11] Patent Number: 4,907,582
[45] Date of Patent: Mar. 13, 1990

[54] SWIVEL CLIP ATTACHMENT FOR DIVER BREATHING TUBE

[76] Inventor: Kurt E. Meyerrose, P.O. Box 832, Rutherfordton, N.C. 28139

[21] Appl. No.: 342,021

[22] Filed: Apr. 24, 1989

[51] Int. Cl.⁴ .............................................. B63C 11/16
[52] U.S. Cl. ................................ 128/201.11; 2/2.1 R; 2/422
[58] Field of Search ...................... 128/201.11, 207.14; 2/422, 2.1 R

[56] References Cited

U.S. PATENT DOCUMENTS

| | | | |
|---|---|---|---|
| 1,122,219 | 12/1914 | Read | 128/201.11 |
| 2,317,236 | 4/1943 | Wilen et al. | |
| 2,478,126 | 8/1949 | Ostby, Jr. | 2/2.1 R |
| 3,051,170 | 8/1962 | Benzel | |
| 3,603,306 | 9/1971 | Bonin | |
| 3,814,090 | 6/1974 | Hill | |
| 4,066,077 | 1/1978 | Shamlian | |
| 4,380,232 | 4/1983 | Doyle | 128/201.11 |
| 4,495,663 | 1/1985 | Shieh | 128/201.11 |
| 4,562,836 | 1/1986 | Perron | |
| 4,610,246 | 9/1986 | Delphia | 128/201.11 |
| 4,638,410 | 1/1987 | Barker | |
| 4,805,610 | 2/1989 | Hunt | 128/201.11 |

*Primary Examiner*—Eugene H. Eickholt
*Attorney, Agent, or Firm*—Bell, Seltzer, Park & Gibson

[57] ABSTRACT

The swivel clip includes a first part which is attached to a diver breathing tube and a second part which is attached to the support strap of an underwater mask. A quickly and easily connectable and removable connection is provided between the first and second parts so that the breathing tube can be easily connected to and removed from the support strap of the underwater mask. The interconnection between the first and second parts also permits swiveling movement of the first part relative to the second part during use. The interconnection between the first and second parts includes a keyhole slot formed in one of the parts and a swivel shaft with an enlarged head formed on the other part and being movable into and out of engagement with the keyhole slot.

10 Claims, 1 Drawing Sheet

SWIVEL CLIP ATTACHMENT FOR DIVER BREATHING TUBE

FIELD OF THE INVENTION

This invention relates generally to a swivel clip for removably attaching a diver breathing tube to the support strap of an underwater mask, and more particularly to such a swivel clip which is of molded plastic construction and includes a first part attached to the breathing tube, a second part attached to the support strap of the mask, and means for removably interconnecting the first and second parts to permit swiveling movement therebetween.

BACKGROUND OF THE INVENTION

It is generally known to be desirable to attach a breathing or snorkel tube to the support strap of an underwater mask. In most instances, the breathing tube is attached to the support strap of the underwater mask by means of a retaining strap supported on the breathing tube and including a looped portion, through which the support strap of the underwater mask is passed. However, this attachment arrangement does not provide for easy attachment and removal of the breathing tube to the face mask. This type of attachment is illustrated in U.S. Pat. Nos. 3,603,306; 3,814,090; 4,066,077; and 4,562,836. U.S. Pat. No. 3,051,170 discloses a breathing tube which is provided with a plastic stud to be pressed into adjustment holes in a head strap or band. U.S. Pat. No. 2,317,236 disoloses attaching a breathing tube to the support strap of an underwater mask by means of a clamping strap surrounding the breathing tube and attachable to the support strap of the underwater mask. However, only limited swiveling movement is permitted by these known devices for attaching the breathing tube to the support strap of the underwater mask. Also, these known attachment devices do not permit quick and easy removal and attachment of the breathing tube to the support strap of the underwater mask.

SUMMARY OF THE INVENTION

With the foregoing in mind, it is an object of the present invention to provide a swivel clip for removably attaching a diver breathing tube to the support strap of an underwater mask which permits swiveling movement between the breathing tube and the mask and includes a first part attached to the breathing tube, a second part attached to the support strap of the mask, and means for removably interconnecting the first and second parts to permit quick and easy attachment of the breathing tube to the support strap of the underwater mask and to permit quick and easy separation of the breathing tube from the underwater mask.

In accordance with the present invention the first part of the swivel clip includes a pair of spaced and parallel upper and lower legs having circular openings for encircling and elastically gripping spaced-apart upper and lower portions of the medial portion of the breathing tube. An intermediate leg member is integrally molded at its upper and lower ends with the upper and lower legs and extends in parallel relationship along one side of the breathing tube. The second part includes an encircling housing through which the support strap of the mask passes to attach the encircling housing thereto. A keyhole slot is formed in the intermediate leg member of the first part and a swivel shaft is fixed on and extends outwardly from the encircling housing of the second part. An enlarged head is formed on the outer end of the swivel shaft with the diameter of the enlarged head being substantially of the same size as the large end of the keyhole slot and the diameter of the swivel shaft being substantially the same size as the small end of the keyhole slot so that the first and second parts may be removably interconnected by inserting the enlarged head into the large end of the keyhole slot and moving the swivel shaft into the small end of the keyhole slot. Opposite sides of the keyhole slot include inwardly extending detents positioned between the large and small ends for resiliently maintaining the swivel shaft in the small end of the keyhole slot. Outwardly extending cam members are positioned adjacent the detents in the keyhole slot and are engageable by the enlarged head when the enlarged head is being moved between the large and small ends of the keyhole slot to further aid in resiliently maintaining the swivel shaft in the small end of the keyhole slot.

BRIEF DESCRIPTION OF THE DRAWINGS

Other objects and advantages will appear as the description proceeds when taken in connection with the accompanying drawings, in which.

DESCRIPTION OF THE PREFERRED EMBODIMENT

Figure 1:
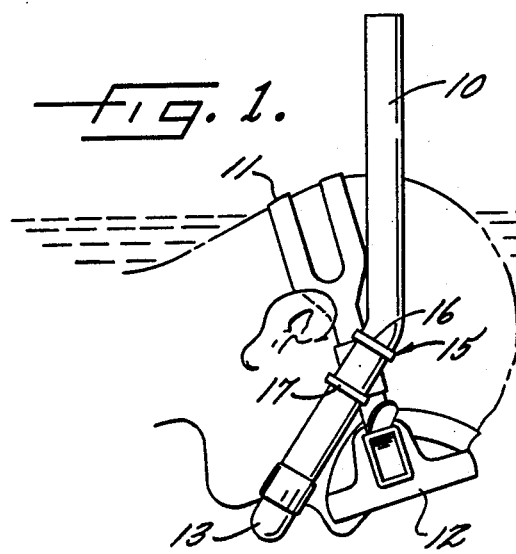
—FIG. 1 is a fragmentary side elevational view showing the present swivel clip attaching the breathing tube to the support strap of the underwater mask.

The present swivel clip is illustrated in FIG. 1 removably attaching a breathing or snorkel tube 10 to a support strap 11 holding an underwater mask 12 across the eyes of the diver. The breathing tube 10 is provided with an upper free end and a lower end to which is attached the usual mouthpiece 13. The support strap 11 is adapted to extend around the head of the wearer and is connected at opposite ends to opposite sides of the underwater mask 12, in the usual manner.

Figure 5:
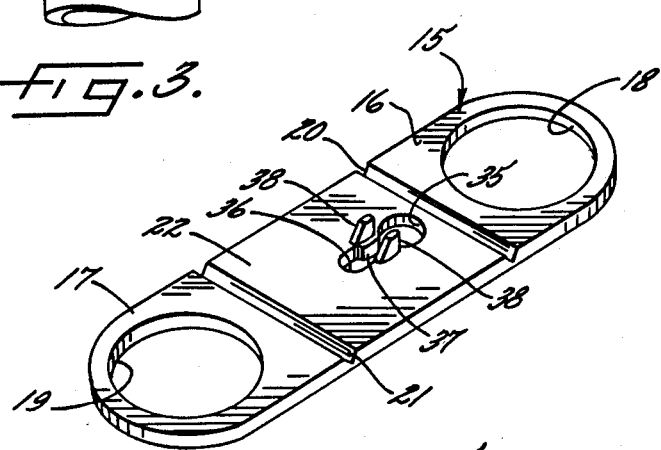
FIG. 5 is an isometric view of the first part of the swivel clip, in flattened condition.

The swivel clip of the present invention is of molded plastic construction and includes a first part, broadly indicated at 15, molded in a flat condition, as illustrated in FIG. 5, and having a pair of spaced and parallel upper and lower legs 16, 17 with respective circular openings 18, 19 formed therein. Depressed fold or bend lines 20, 21 are molded transversely of the first part 15 and define the hinged connection of the upper and lower integrally molded legs 16, 17 with opposite ends of an intermediate leg member 22 therebetween.

Figure 2:
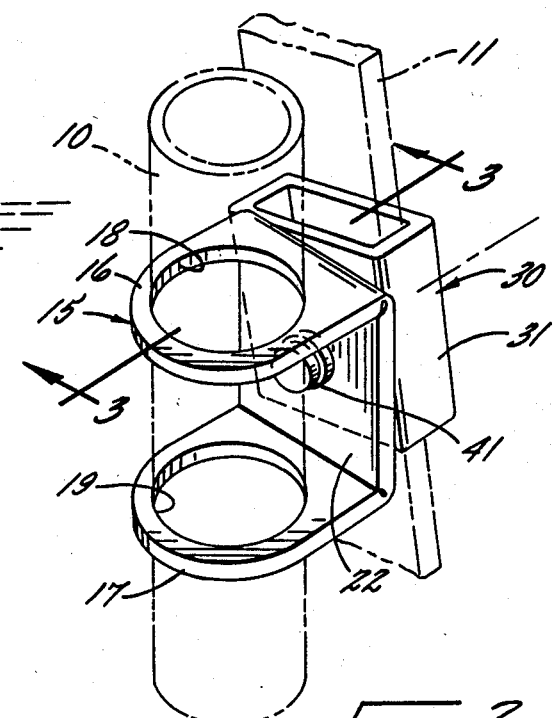
FIG. 2 is an enlarged isometric view of the present swivel clip.
Figure 3:
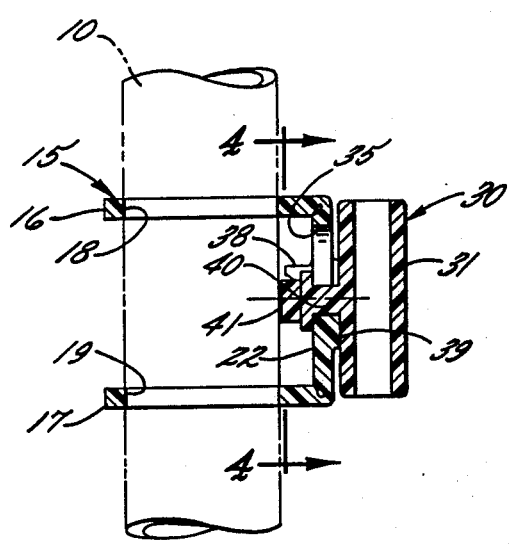
FIG. 3 is a vertical sectional view taken substantially along the line 3—3 in FIG. 2.

The first part 15 is attached to the breathing tube 10 by bending the upper and lower legs 16, 17 into right angular relationship with the intermediate leg member 22 and passing the breathing tube 10 through the circular openings 18, 19 to encircle and elastically grip spaced-apart upper and lower portions of the medial portion of the breathing tube 10, as illustrated in FIGS. 1–3. The first part 15 remains resiliently attached to the brething tube 10, both when the breathing tube 10 is attached to the support strap 11, and when the breathing tube 10 is removed therefrom, in a manner to be presently desoribed.

The swivel clip of the present invention also includes a second part, broadly indicated at 30. The second part 30 includes an elongated encircling housing 31 which is rectangular in cross section and through which the support strap 11 of the mask 12 passes to attach the encircling housing 31 thereto. The encircling housing 31 of the second part 30 remains attached to the support strap 11 of the mask 12 both when the breathing tube 10 is attached thereto and when the breathing tube 10 is removed therefrom, in a manner to be presently described.

Figure 4:
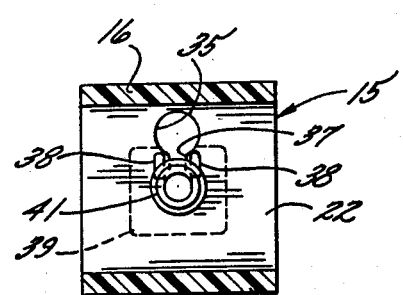
FIG. 4 is an enlarged vertical sectional view taken substantially along the line 4—4 in FIG. 3.

Means is provided for removably interconnecting the intermediate leg member 22 of the first part 15 to the encircling housing 31 of the second part to permit quick and easy attachment of the breathing tube 10 to the supporting strap 11 and to permit quick and easy removal of the breathing tube 10 from the supporting strap 11. The means for removably interconnecting the first part 15 and the second part 30 also permits swiveling movement of the first part 15 relative to the second part 30 and includes a keyhole slot or opening formed in the intermediate leg member 22 of the first part 15. The keyhole slot includes a large end 35 and a small end 36 with inwardly extending detents 37 positioned between the large end 35 and the small end 36 and on opposite sides of the keyhole slot. Additionally, integrally molded cam members 38 are positioned adjacent the detents 37 and extend inwardly from the inner face of the intermediate leg member 22 (FIG. 5). The outer face of the intermediate leg member 22 is provided with an integrally molded pivot pad 39 (FIGS. 3 and 4) which surrounds the small end 36 of the keyhole slot. This pivot pad 39 serves to space the outer face of the intermediate leg member 22 from the adjacent face of the encircling housing 31 to enhance pivotal movement therebetween, when the two parts are in assembled condition.

Figure 6:
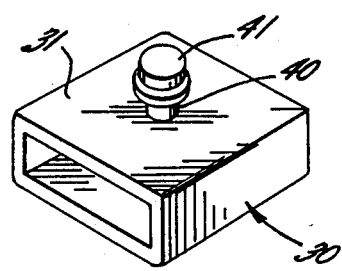
FIG. 6 is an isometric view of the second part of the swivel clip.

The means for removably interconnecting the intermediate leg member 22 of the first part 15 to the encircling housing 31 of the second part 30 also includes a swivel shaft 40 fixed on and extending outwardly from the medial portion of the encircling housing 31 (FIG. 6). An enlarged head 41 is formed on the outer end of the swivel shaft 40 and is of a stepped configuration. The diameter of the enlarged head 41 substantially corresponds to the size of the large end 35 of the keyhole slot while the diameter of the swivel shaft 40 substantially corresponds to the size of the small end 36 of the keyhole slot.

The first part 15 and the second part 30 can be quickly and easily interconnected by inserting the enlarged head 41 into and through the large end 35 of the keyhole slot and moving the swivel shaft 40 into the small end 36 of the keyhole slot, forcing the swivel shaft 40 past the detents 37 and the enlarged head 41 past the cam members 38 so that the first part 15 is connected to the second part 30 and is free to swivel relative thereto. Thus, the breathing tube 10 is removably connected to the support strap 11 for use by the wearer, as illustrated in FIG. 1.

After the diver has completed use of the breathing tube 10 and the mask 12, they can be easily and quickly separated by moving the swivel shaft 40 and the enlarged head 41 from the small end 36 of the keyhole slot to the large end 35, forcing the swivel shaft 40 past the detents 37 and the enlarged head 41 past the cam members 38. When the swivel shaft 40 and the enlarged head 41 are positioned in the large end 35 of the keyhole slot, the enlarged head 41 can be withdrawn through the large end 35 of the keyhole slot to separate the first part 15 and the attached breathing tube 10 from the second part 30 and the attached support strap 11.

Thus, the swivel clip of the present invention includes a first part 15 which remains attached to the breathing tube 10 and a second part 30 which remains attached to the support strap 11 of the mask 12. The first and second parts are easily and quickly connected together to attach the breathing tube 10 to the support strap 11 and are easily and quickly separated to remove the breathing tube 10 from the support strap 11 after use. Also, the first and second parts of the swivel clip are removably interconnected to permit swiveling movement of the first part 15 relative to the second part 30.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A swivel clip for removably attaching a diver breathing tube to the support strap of an underwater mask, wherein said breathing tube includes a free end and a mouthpiece on the opposite end, and wherein the support strap is adapted to extend around the head of the wearer and is connected at opposite ends to opposite sides of said mask, said swivel clip being of molded plastic construction and comprising
    (a) a first part including a pair of spaced and parallel upper and lower legs having openings for encircling and elastically gripping medial portions of said breathing tube, and an intermediate leg member having upper and lower ends integrally molded with said upper and lower legs and extending in parallel relationship along one side of said breathing tube,
    (b) a second part including an encircling housing through which the support strap of said mask passes to attach said encircling housing thereto, and
    (c) means for removably interconnecting said intermediate leg member of said first part to said encircling housing of said second part, and for permitting swiveling movement of said first part relative to said second part.

2. A swivel clip according to claim 1 wherein said means for removably interconnecting said first and second parts includes slot means formed in one of said intermediate leg member of said first part and said encircling housing of said second part, and a swivel shaft fixed on and extending outwardly from the other of said intermediate leg member of said first part and said encircling housing of said second part, an enlarged head formed on the outer end of said swivel shaft, and wherein said enlarged head may be removably interconnected to said slot means.

3. A swivel clip according to claim 1 wherein said means for removably interconnecting said first and second parts includes a keyhole slot formed in one of said intermediate leg member of said first part and said encircling housing of said second part, said keyhole slot including opposed large and small ends, and a swivel shaft fixed on and extending outwardly from the other of said intermediate leg member of said first part and said encircling housing of said second part, an enlarged head formed on the outer end of said swivel shaft, and wherein the diameter of said enlarged head substantially corresponds to the size of the large end of said keyhole slot and the diameter of said swivel shaft substantially corresponds to the size of the small end of said keyhole slot so that said first and second parts may be removably interconnected by inserting said enlarged head into the large end of said keyhole slot and moving said swivel shaft into the small end of said keyhole slot.

4. A swivel clip according to claim 3 wherein said keyhole slot is formed in said intermediate leg member of said first part, and wherein said swivel shaft is fixed on and extends outwardly from said encircling housing of said second part.

5. A swivel clip according to claim 4 wherein opposite sides of said keyhole slot include inwardly extending detents positioned between the large and small ends of said keyhole slot for resiliently maintaining said swivel shaft in the small end of said keyhole slot.

6. A swivel clip according to claim 5 including outwardly extending cam members positioned adjacent said detents and being engageable by said enlarged head when being moved between the large and small ends of said keyhole slot to further aid in resiliently maintaining said swivel shaft in the small end of said keyhole slot.

7. A swivel clip for removably attaching a diver breathing tube to the support strap of an underwater mask, wherein said breathing tube includes a free end and a mouthpiece on the opposite end, and wherein the support strap is adapted to extend around the head of the wearer and is connected at opposite ends to opposite sides of said mask, said swivel clip comprising (a) a first part including a pair of spaced and parallel upper and lower legs having circular openings for encircling and elastically gripping spaced-apart upper and lower portions in a medial portion of said breathing tube, and an intermediate leg member having upper and lower ends integrally molded with said upper and lower legs and extending in parallel relationship along one side of said breathing tube, (b) a second part including an encircling housing through which the support strap of said mask passes to attach said encircling housing thereto, and (c) means for removably interconnecting said intermediate leg member of said first part to said encircling housing of said second part, and for permitting swiveling movement of said first part relative to said second part, and wherein said means for removably interconnecting said first and second parts includes a keyhole slot formed in said intermediate leg member of said first part, and a swivel shaft fixed on and extending outwardly from said encircling housing of said second part, an enlarged head formed on the outer end of said swivel shaft, and wherein the diameter of said enlarged head substantially corresponds to the size of the large end of said keyhole slot and the diameter of said swivel shaft substantially corresponds to the size of the small end of said keyhole slot so that said first and second parts may be removably interconnected by inserting said enlarged head into the large end of said keyhole slot and moving said swivel shaft into the small end of said keyhole slot.

8. A swivel clip according to claim 7 wherein opposite sides of said keyhole slot include inwardly extending detents positioned between the large and small ends of said keyhole slot for resiliently maintaining said swivel shaft in the small end of said keyhole slot.

9. A swivel clip according to claim 8 including outwardly extending cam members positioned adjacent said detents and being engageable by said enlarged head when being moved between the large and small ends of said keyhole slot to further aid in resiliently maintaining said swivel shaft in the small end of said keyhole slot.

10. A swivel clip according to claim 7 wherein said first and second parts are molded of resilient plastic material.

* * * * *